United States Patent [19]

Rader, III

[11] Patent Number: 5,095,770
[45] Date of Patent: Mar. 17, 1992

[54] STEERING BEARING ASSEMBLY FOR WHEELED VEHICLE

[76] Inventor: Homer J. Rader, III, 4344 Mockingbird Pkwy., Dallas, Tex. 75205

[21] Appl. No.: 590,575

[22] Filed: Sep. 28, 1990

[51] Int. Cl.[5] .......................................... B62K 21/12
[52] U.S. Cl. .................................. 74/551.1; 74/551.3; 280/279; 403/24
[58] Field of Search .................... 74/551, 551.1, 551.2, 74/551.3; 280/275-280; 403/24, 88

[56] References Cited

U.S. PATENT DOCUMENTS

| 681,325 | 8/1901 | Hullt | 74/551.2 |
|---|---|---|---|
| 2,310,064 | 2/1943 | Conti | 280/279 |
| 3,136,149 | 6/1964 | Klein, Jr. | 74/551.1 |
| 3,260,535 | 7/1966 | Jaulmes | 280/279 |
| 3,284,114 | 11/1966 | McCord, Jr. et al. | 287/58 |
| 3,306,684 | 2/1967 | Klein, Jr. | 280/279 |
| 3,942,822 | 3/1976 | Lewis | 74/551.3 |
| 4,323,263 | 4/1982 | Cook et al. | 280/279 |
| 4,340,238 | 7/1982 | Cabeza | 280/279 |
| 4,410,197 | 10/1983 | St. Hillaire | 280/279 |
| 4,526,491 | 7/1985 | Pawsat | 403/24 |
| 4,624,470 | 11/1986 | Love | 280/279 |
| 4,653,768 | 3/1987 | Keys et al. | 74/551.1 |
| 4,783,187 | 11/1988 | McMurtrey | 403/24 |
| 4,794,815 | 1/1989 | Borromeo | 74/551.1 |

FOREIGN PATENT DOCUMENTS 0561703 10/1923 France .
1101558 10/1955 France .
1-68294 5/1987 Japan .

Primary Examiner—Rodney H. Bonck
Assistant Examiner—Winnie Yip
Attorney, Agent, or Firm—David L. McCombs

[57] ABSTRACT

A steering bearing assembly is provided for connecting the front wheel and handle bars of a bicycle to the frame. The assembly includes a steerer tube, connected to the front wheel and passing through a head tube on the frame. Bearing assemblies on the upper and lower ends of the head tube allow the steerer tube to pivot within the head tube. The upper bearing assembly has a first race connected to the head tube and a second race having a tapered contact surface. Above the second race on the steerer tube is a compression ring having a gap so the ring can be compressed against the steerer tube. The connector of a stem is located on the steerer tube above the compression ring. The handle bars of the bicycle are connected to the stem. An adjuster nut is threaded into the upper end of the steerer tube, exerting a downward force on the connector and the compression ring. The second race compresses the compression ring, locking the upper bearing assembly in place on the steerer tube. The connector is then clamped onto the steerer tube.

10 Claims, 2 Drawing Sheets

STEERING BEARING ASSEMBLY FOR WHEELED VEHICLE

BACKGROUND OF THE INVENTION

1. Field of the Invention

This invention relates in general to wheeled vehicles, such as bicycles. In particular, the invention relates to an assembly for connecting the front wheel and handle bars to the frame of the wheeled vehicle.

2. Description of the Prior Art

In some prior art bicycles, the front wheel and the handle bars are connected to a steerer tube. The steerer tube passes through a head tube connected to the bicycle frame. Ball bearing assemblies, located at the upper and lower ends of the head tube, allow the steerer tube to pivot within the head tube.

The upper end of the steerer tube is threaded externally. An internally threaded lock nut is placed on the steerer tube and tightened until the lock nut secures the upper race of the upper bearing assembly downward against the lower race.

Unfortunately, this assembly is difficult to adjust with respect to preload on the bearings. Further, the prior art assembly includes a multiplicity of components which renders it unnecessarily complicated and heavy. Most types of bicycling, such as mountain biking, racing, and free-style biking can cause the lock nut to become loose in a very short time. Also, the manufacture of such assemblies is relatively expensive. Other shortcomings are apparent to those skilled in the art.

SUMMARY OF THE INVENTION

The steering bearing assembly of the invention has a head tube connected to the vehicle frame. A steerer tube is connected between the front wheel of the vehicle and the handle bars and passes through the head tube. A pair of bearing assemblies allow the steerer tube to pivot within the head tube.

The upper bearing assembly has two races, the first race being connected to the head tube. The second race has a contact surface tapered at an angle to the longitudinal axis of the steerer tube.

A compression ring is located on the steerer tube above the second race. The compression ring has a tapered contact surface that abuts the contact surface on the second race. The compression ring also has one or more gaps, or is suitably elastic, so that the ring can be compressed against the steerer tube.

An adjuster nut having external threads is threaded into internal threads in the upper end of the steerer tube. As the adjuster nut is threaded inward, the nut exerts a longitudinal force on the compression ring. The tapered contact surface on the compression ring exerts a longitudinal force and a radial force on the second race.

In reaction, the second race exerts equal and opposite forces on the compression ring. The compression ring is compressed into the steerer tube, thus locking the compression ring to the steerer tube.

DESCRIPTION OF THE PREFERRED EMBODIMENT

Figure 1:
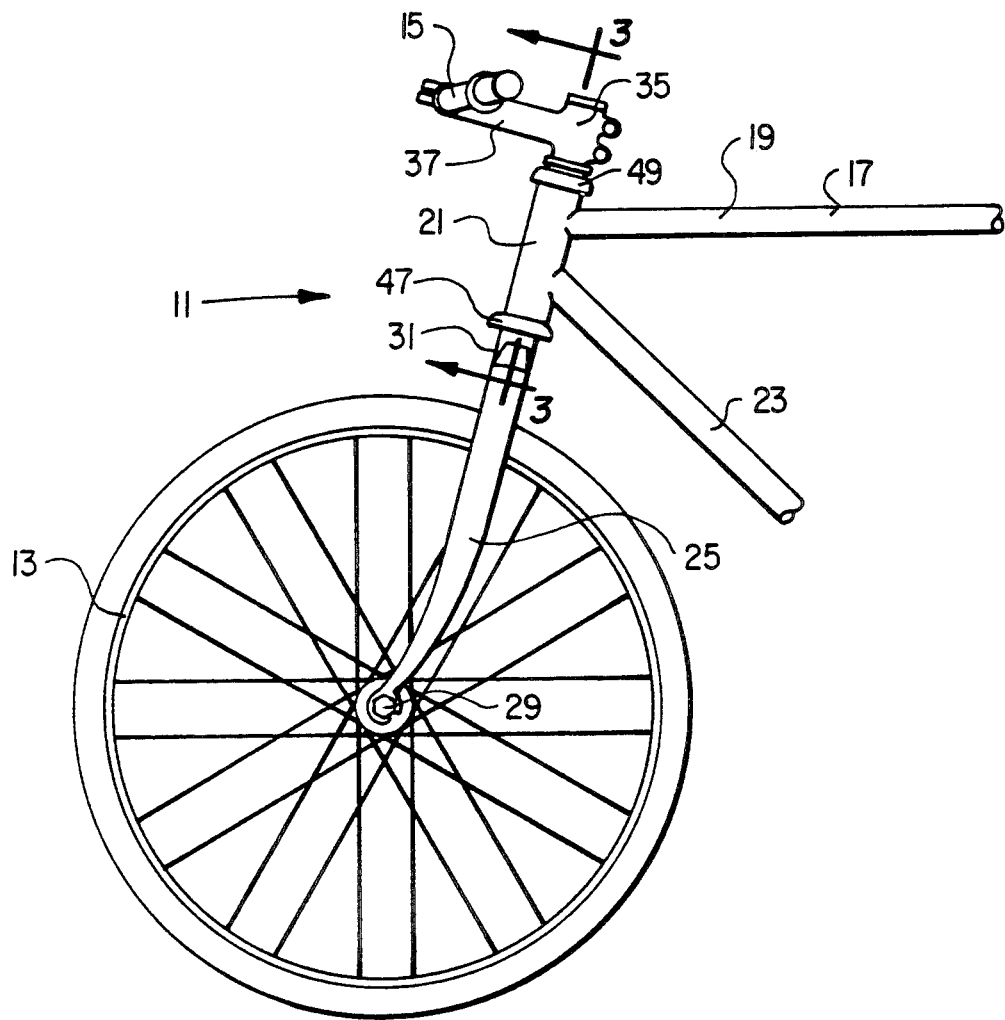
FIG. 1 is a side view of the front end of a bicycle incorporating the steering bearing assembly of the invention.

The steering bearing assembly of the invention is intended for use on wheeled vehicles. FIG. 1 shows the invention in use on a bicycle 11, although the invention would also be useful on a tricycle.

FIG. 1 shows the front wheel 13, the handle bars 15, and the forward portion of the bicycle frame 17. The bicycle frame 17 has a horizontal top tube 19, welded to a head tube 21. A down tube 23 extends downward and rearward from the head tube 21, below the top tube 19.

A pair of fork blades 25 and 27 are bolted to the axle bolt 29 of the front wheel 13. The upper ends of the fork blades 25 and 27 are connected to a fork crown 31.

Figure 2:
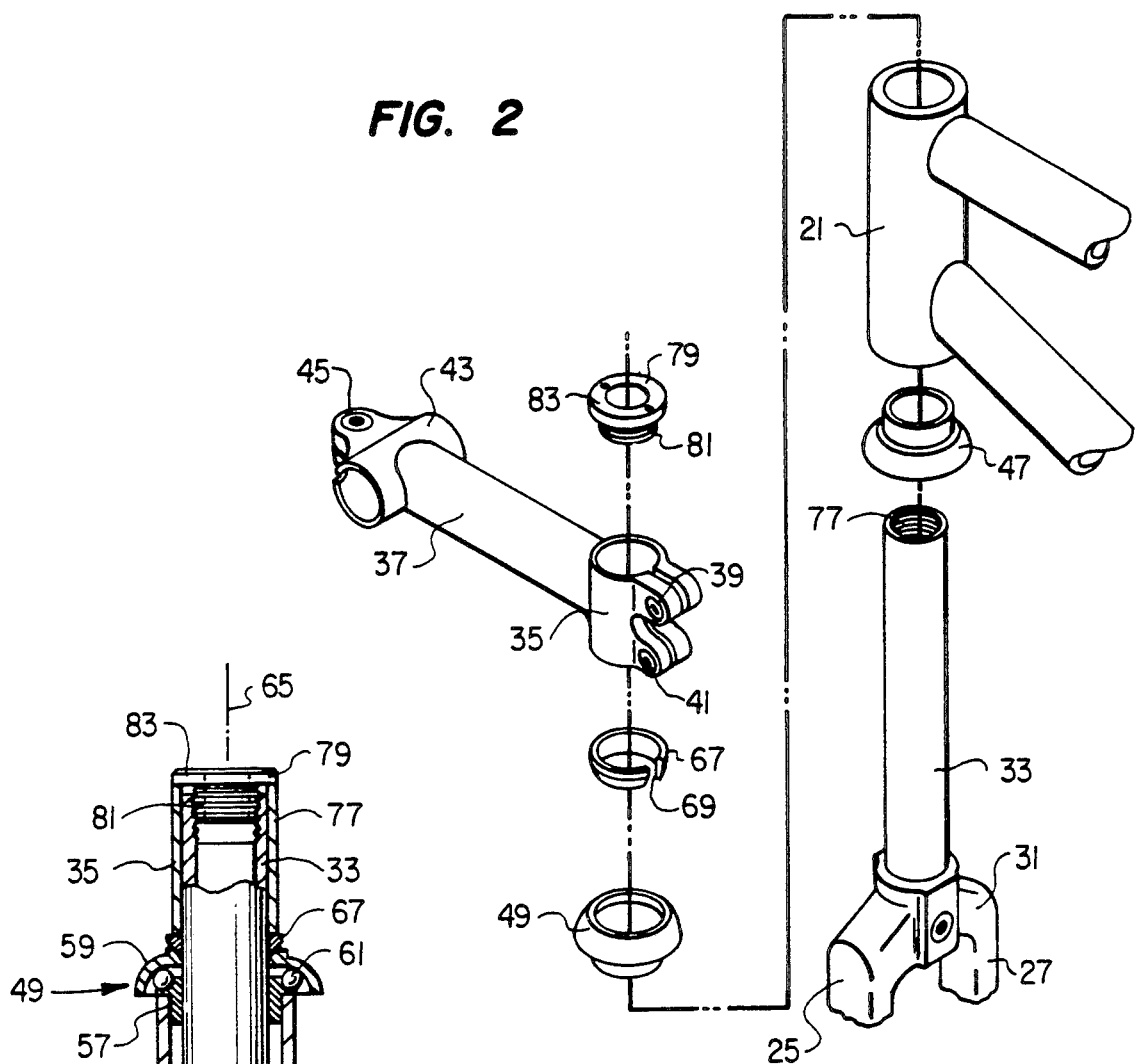
FIG. 2 is an exploded view of the steering bearing assembly of the invention.
Figure 3:
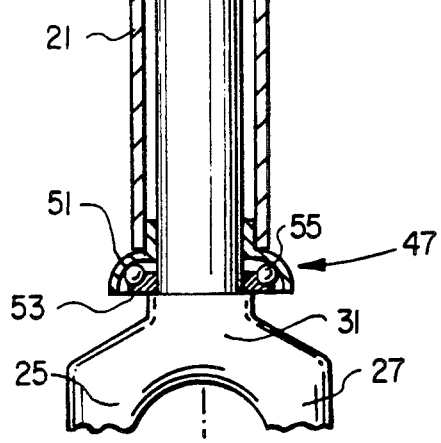
FIG. 3 is a sectional view of the steering bearing assembly of the invention, as seen along line 3—3 in FIG. 1.

A steerer tube 33 extends upward from the fork crown 31, as shown in FIGS. 2 and 3. The steerer tube 33 passes through the head tube 21 and through a connector 35 on one end of stem a 37. The connector 35 is clamped to the steerer tube 33 with a pair of bolts 39 and 41, so the stem 37 can be replaced or adjusted.

The handle bars 15 pass through a second connector 43 on the other end of the stem 37. The second connector 43 has a bolt 45, so the handle bars 15 can be replaced or adjusted. Thus, the handle bars 15 are connected to the front wheel 13, so that the front wheel 13 can be turned by turning the handle bars 15.

The steerer tube 33 must be secured relative to the head tube 21 for rotational movement only with respect to the head tube 21 when the handle bars 15 are turned. Thus, there is a lower bearing assembly 47 and an upper bearing assembly 49 between the steerer tube 33 and the head tube 21. As shown in FIG. 3, the lower bearing assembly 47 has a first race 51 and a second race 53. A plurality of ball bearings 55 are enclosed between the first and second races 51 and 53.

The first race 51 of the lower bearing assembly 47 is press fit into the lower end of the head tube 21, so the that the first race pivots with the head tube 21. The second race 53 of the lower bearing assembly 47 is press fit into the steerer tube 21, so that the second race 53 pivots with the steerer tube 33. The first and second races 51, 53 are supported to rotate relative to each other by the ball bearings 55.

The upper bearing assembly 49 is located at the upper end of the head tube 21. The upper bearing assembly 49 also has a first race 57 and a second race 59, encasing a plurality of ball bearings 61. The first and second races 57, 59 are supported to rotate relative to each other by the ball bearings 61. The first race 57 of the upper bearing assembly 49 is press fit into the upper end of the head tube 21, so that the first race 57 pivots with the head tube 21.

Figure 4:
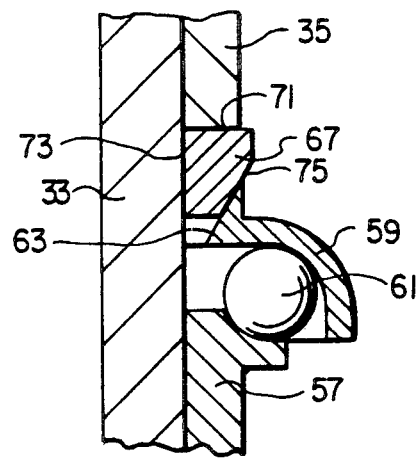
FIG. 4 is a enlarged view of a portion of the steering bearing assembly shown in FIG. 3.

The second race 59 of the upper bearing assembly 49 has an annular contact surface 63, best shown in FIG. 4. The annular contact surface 63 is tapered at an angle to the longitudinal axis 65 of the steerer tube 33, shown in FIG. 3. Also, as shown in FIG. 4, the second race has an inner diameter that is greater than the outer diameter of the steerer tube, so that it is carried thereby with clearance relative to the steerer tube.

An annular compression ring 67 is located above the upper bearing assembly 49. The compression ring 67 has a small gap 69, as shown in FIG. 2, so that the ring 67 can be compressed. The compression ring 67 also has an upper surface 71, an inner surface 73, and a tapered contact surface 75. The contact surface 75 is tapered at the same angle, relative to the longitudinal axis of the steerer tube 33, as the contact surface 63 on the second race 59 of the upper bearing assembly 49. The contact surface 75 on the compression ring 67 abuts the contact surface 63 on the second race 59. The upper surface 71 of the compression ring 67 abuts the lower end of the connector 35 on the stem 37.

The upper end of the steerer tube 33 has internal threads 77, as shown in FIGS. 2 and 3. An adjuster nut 79, having external threads 81, is threaded into the upper end of the steerer tube 33. The adjuster nut 79 has a head 83 that contacts the upper end of the connector 35 on the stem 37. The connector 35 extends above the upper end of the steerer tube 33, leaving a gap between the head 83 of the adjuster nut 79 and the steerer tube 33, as shown in FIG. 3.

In assembly of the steering bearing assembly of the invention, the head tube 21 is placed over the steerer tube 33, with the upper bearing assembly 49 on the upper end of the head tube 21. The compression ring 67 is then placed on the steerer tube 33 above the upper bearing assembly 49. Next, the connector 35 of the stem 37 is positioned on the steerer tube 33, above the compression ring 69.

When all of the elements are in place, the adjuster nut 79 is threaded into the upper end of the steerer tube 33. As the adjuster nut 79 is threaded, the head 83 of the adjuster nut 79 contacts the upper end of the connector 35 on the stem 37, and forces the connector downward on the steerer tube 33. In turn, the connector 35 exerts a downward force on the upper surface 71 of the compression ring 67. Thus, the adjuster nut 79 serves as a locking member which acts to simultaneously axially retain the mounting stem on the steerer tube 33 and to force the compression ring 67 toward the upper bearing assembly so as to firmly engage the compression ring 67 between second race 59 of the upper bearing assembly 49 and the steerer tube 33.

As the compression ring 67 is forced downward, the contact surface 75 on the compression ring 67 exerts a longitudinal force and a radial force on the contact surface 63 of the second race 59 of the upper bearing assembly 49. In reaction, the second race 59 exerts equal and opposite forces on the compression ring 67. The compression ring 67 is compressed against the steerer tube 33, locking the compression ring 67 in place on the steerer tube 33. The head tube 21 and the two bearing assemblies 47 and 49 are secured between the fork crown 31 and the connector 35.

Finally, the bolts 39 and 41 on the connector 35 are tightened to secure the stem 37 to the steerer tube 33. When the connector 35 is secured to the steerer tube 33, the connector 35 does not exert any upward forces on the adjuster nut 79.

The steering bearing assembly of the invention has several advantages over the prior art. The design of the invention allows the stem 37 to be clamped directly to the steerer tube 33, so the connection is lighter and stronger than prior art designs. Further, the assembly of the invention is easier to assemble and to adjust. Also, since there are no forces acting on the adjuster nut 79, the nut 79 is less likely to loosen. Additionally, the internal threads 77 in the steerer tube 33 are not located in a high stress area of the steerer tube. Further, the assembly allows for a secure connection of the steerer tube relative to the head tube without lateral "play" or movement. Over all, a bicycle embodying the invention is lighter, stronger, and less expensive than the prior art.

The invention has been shown in only one embodiment. It should be apparent to those skilled in the art that the invention is not so limited, but is susceptible to various changes and modifications without departing from the spirit of the invention. For example, a variety of means may be implemented to provide radial and longitudinal forces between the second bearing and the steerer tube. Such may form a portion of the connector 35 or be provided as a separate component. The compression ring 67 or other compression element may include multiple gaps or segments and be constructed of a combination of elastic and rigid components, or an elastic compound. It is understood that the assembly may be arranged such that the location of the bearing assembly is inverted, or placed on the other end of the head tube. Other variations will be apparent to those skilled in the art.

What is claimed is:

1. A steering bearing assembly, comprising:
    a head tube, connected to a vehicle frame;
    a nonexternally threaded steerer tube having a cylindrical, smooth outer surface connected between a wheel and vehicle handle bars and passing through the head tube;
    a bearing assembly to allow the steerer tube to pivot within the head tube, the bearing assembly having a first race and a second race, the first race being connected to the head tube and the second race being carried on the steerer tube with a clearance therebetween; and
    force means for exerting a radial force between the smooth outer surface of the steerer tube and the second race and for exerting a longitudinal force on the second race to push the second race toward the first race and to fix the second race on the steerer tube.

2. A steering bearing assembly as defined in claim 1, wherein the force means further comprises:
    a compression ring having a contact surface for contacting a contact surface on the second race, wherein the contact surfaces are tapered at an angle to the longitudinal axis of the steerer tube; and
    said means for exerting said longitudinal force on the compression ring.

3. A steering bearing assembly as defined in claim 2, wherein the means for exerting a said longitudinal force on the compression ring further comprises an adjuster nut threaded to the steerer tube.

4. A steering bearing assembly as defined in claim 3, further comprising:
    a stem for connecting said handle bars to the steerer tube;
    a connector on one end of the stem, wherein the steerer tube passes through the connector and wherein the connector is located between the adjuster nut and the compression ring; and
    a bolt for clamping the connector to the steerer tube.

5. A steering bearing assembly as defined in claim 3, wherein the adjuster nut has external threads and is threaded into internal threads on the steerer tube.

6. A steering bearing assembly, comprising:
    a head tube connected to a vehicle frame;

a nonexternally threaded steerer tube having a cylindrical, smooth outer surface and a longitudinal axis connected to a front wheel and passing through the head tube;

a first bearing assembly on a first end of the head tube to allow the steerer tube to pivot within the head tube;

a second bearing assembly on a second end of the head tube, the second bearing assembly having a first race and a second race, the first race being connected to the head tube and the second race being carried on the steerer tube with a clearance therebetween and having a contact surface tapered at an angle to the longitudinal axis of the steerer tube;

a compression ring on a smooth surface of the steerer tube against the second bearing assembly, having a contact surface that is tapered and abuts the contact surface on the second race of the second bearing assembly; and an adjuster nut for exerting a longitudinal force on the compression ring toward the second bearing assembly to push said second race toward said first race.

7. A steering bearing assembly as defined in claim 6, wherein the compression ring has a gap so that the compression ring is compressed against the steerer tube as the adjuster nut exerts the longitudinal force.

8. A steering bearing assembly as defined in claim 7, further comprising:

a set of handle bars;

a stem connected to the handle bars and having a connector at one end, wherein the steerer tube passes through the connector and the connector is located between the adjuster nut and the compression ring; and a bolt for clamping the stem to the steerer tube.

9. A steering bearing assembly for a two wheel vehicle comprising:

a head tube connected to a vehicle frame;

a steerer tube connected to a front wheel fork of a vehicle, said steerer tube passing through the head tube with clearance therebetween;

a lower bearing assembly connected between the head tube and the steerer tube and providing rotational support for the head tube relative to the steerer tube;

an upper bearing assembly connected to the head tube and carried thereby with clearance relative to the steerer tube, the inner diameter of the upper bearing assembly being greater than the outer diameter of the steerer tube;

a compression member disposed on the upper bearing assembly and engageable in the clearance between the upper bearing assembly and the steerer tube, said compression member, when engaged in the clearance between the upper bearing assembly and the steerer tube fixing the upper bearing assembly to the steerer tube in a manner providing rotational support therefor;

a mounting stem for connection of a handle bar to the steerer tube, said mounting stem being disposed on said compression member about said steerer tube; and a locking member secured on said steerer tube above said mounting stem, said locking member being axially displaceable toward said mounting stem and acting to simultaneously axially retain the mounting stem on the steerer tube and to force the compression member toward the upper bearing assembly so as to firmly engage the compression member between the upper bearing assembly and the steerer tube.

10. A steering bearing assembly according to claim 9, wherein the compression member is a compression ring which is directly wedged between an outer surface of the upper bearing assembly and an outer surface of the steerer tube so as to eliminate all play therebetween under the action of said locking member.

* * * * *

UNITED STATES PATENT AND TRADEMARK OFFICE
CERTIFICATE OF CORRECTION

PATENT NO. : 5,095,770

DATED : March 17, 1992

INVENTOR(S) : Homer J. Rader, III

It is certified that error appears in the above-identified patent and that said Letters Patent is hereby corrected as shown below:

Column 2, line 24, change "stem a" to -- a stem --.

Claim 3, line 52, change "exerting a said" to -- exerting said --.

Signed and Sealed this

Tenth Day of August, 1993

Attest:

MICHAEL K. KIRK

Attesting Officer

Acting Commissioner of Patents and Trademarks

REEXAMINATION CERTIFICATE (3981st)

United States Patent
Radar, III

[11] B1 5,095,770
[45] Certificate Issued Jan. 25, 2000

[54] STEERING BEARING ASSEMBLY FOR WHEELED VEHICLE

[76] Inventor: Homer J. Radar, III, 4344 Mockingbird Pkwy., Dallas, Tex. 75205

Reexamination Request:
No. 90/004,391, Sep. 30, 1996

Reexamination Certificate for:
Patent No.: 5,095,770
Issued: Mar. 17, 1992
Appl. No.: 07/590,575
Filed: Sep. 28, 1990

Certificate of Correction issued Aug. 10, 1993.

[51] Int. Cl.$^7$ ..................................................... B62K 12/12
[52] U.S. Cl. ........................ 74/551.1; 74/551.3; 280/279; 403/24
[58] Field of Search ..................................... 74/551, 551.1, 74/551.2, 551.3; 280/275–280; 403/24, 88

[56] References Cited

U.S. PATENT DOCUMENTS 573,316  12/1896  Willits .

FOREIGN PATENT DOCUMENTS 7628810  10/1977  France .
1144142   2/1963  Germany .
1-68294   5/1989  Japan .
3-47293   5/1991  Japan .

OTHER PUBLICATIONS

Taiwan Bicycles & Parts Buyers' Guide 1989.

*Primary Examiner*—Carl Friedman

[57] ABSTRACT

A steering bearing assembly is provided for connecting the front wheel and handle bars of a bicycle to the frame. The assembly includes a steerer tube, connected to the front wheel and passing through a head tube on the frame. Bearing assemblies on the upper and lower ends of the head tube allow the steerer tube to pivot within the head tube. The upper bearing assembly has a first race connected to the head tube and a second race having a tapered contact surface. Above the second race on the steerer tube is a compression ring having a gap so the ring can be compressed against the steerer tube. The connector of a stem is located on the steerer tube above the compression ring. The handle bars of the bicycle are connected to the stem. An adjuster nut is threaded into the upper end of the steerer tube, exerting a downward force on the connector and the compression ring. The second race compresses the compression ring, locking the upper bearing assembly in place on the steerer tube. The connector is then clamped onto the steerer tube.

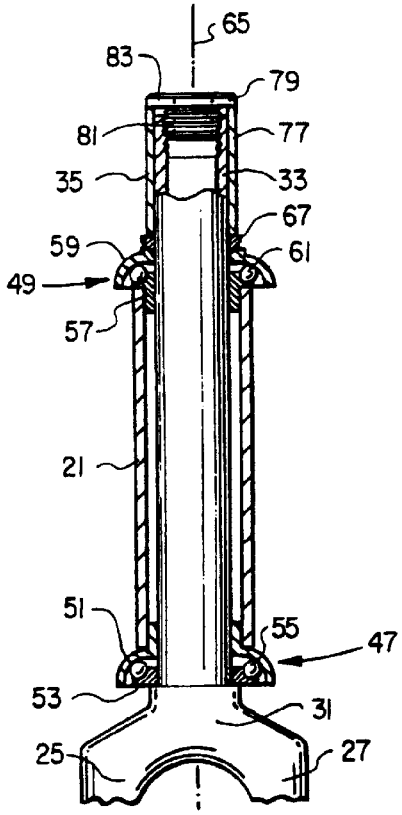

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

\* \* \* \* \*